Dec. 22, 1959  A. C. CAPELLE  2,917,954
ALIGNMENT TOOL
Filed June 11, 1957  2 Sheets-Sheet 1
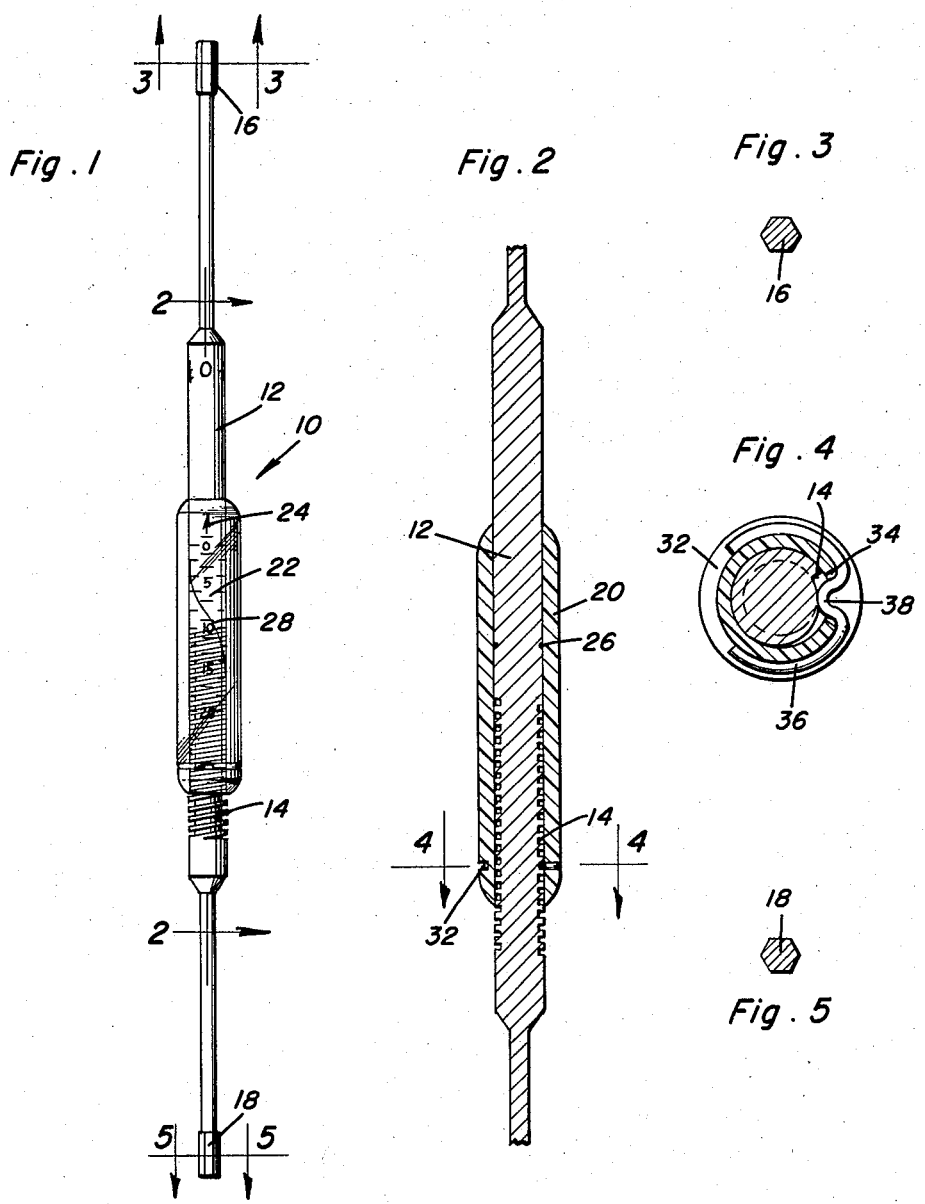
Arthur C. Capelle
INVENTOR.

Dec. 22, 1959     A. C. CAPELLE     2,917,954
ALIGNMENT TOOL
Filed June 11, 1957     2 Sheets-Sheet 2
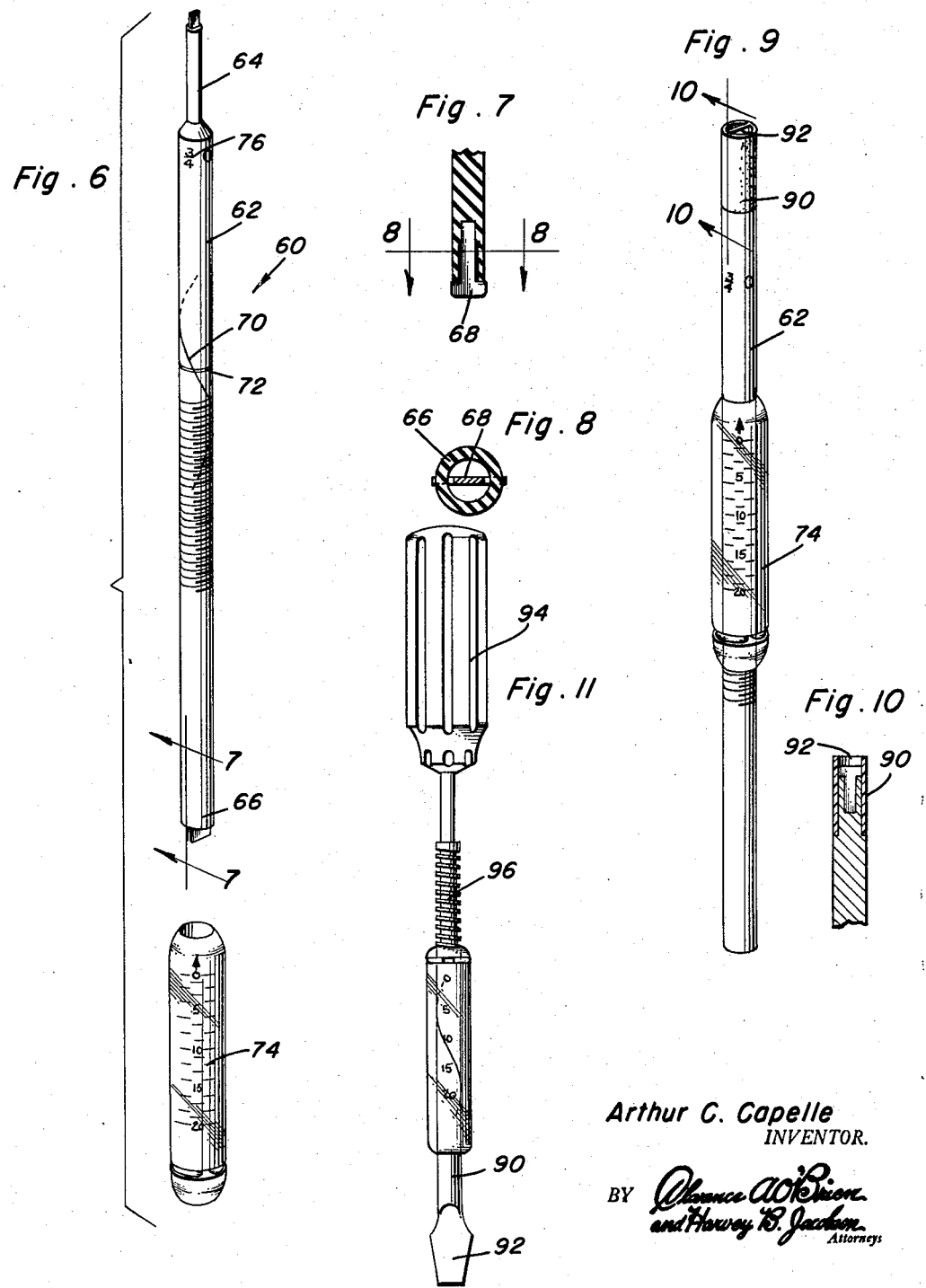
Arthur C. Capelle
INVENTOR.

United States Patent Office 2,917,954
Patented Dec. 22, 1959

2,917,954
ALIGNMENT TOOL
Arthur C. Capelle, Bradenton, Fla.
Application June 11, 1957, Serial No. 665,058
3 Claims. (Cl. 81—3)

This invention relates to the class of tools and more particularly to a device especially adapted for utilization in the adjustment of control screws for television sets, automobiles and various other mechanisms and machines.

The primary object of the present invention resides in the provision of an alignment tool having means for determining the change in position of an adjustment screw or other control devices independent of the number of separate turns in one direction or the other during the alignment and adjustment procedure.

A further object of the invention resides in the provision of an adjustment tool which will enable a mechanic to locate the unknown adjustment member or screw that would give a desired response when adjusted so as to effectively adjust the operation of the machine being worked upon. This object may be achieved by adjusting all control members and by eliminating the control members that do not cause the proper response by enabling these control members to be returned to their original setting in a convenient manner.

A further object of the invention resides in the provision of an adjustment tool which will enable fast, accurate and dependable adjustments on all screws or like control devices to be made without fear or hesitation that the device being worked upon will be thrown completely out of adjustment since without this tool there may be no way of knowing how to return the control device back to its original setting.

The construction of this invention features the utilization of a novel index housing sleeve of transparent material having a novel clip means associated therewith for engaging the threaded shank of the tool whereby movement of the index housing sleeve can be adequately controlled.

Still further objects and features of this invention reside in the provision of an alignment tool that is simple in construction, highly efficient in use, and relatively inexpensive to manufacture thereby permitting wide use and distribution.

These, together with the various ancillary objects and features of the invention which will become apparent as the following description proceeds, are attained by this alignment tool, preferred embodiments of which have been illustrated in the accompanying drawings, by way of example only, wherein:

Figure 1 is an elevational view of a form of adjustment tool constructed in accordance with the concepts of the present invention and having oppositely disposed working ends;

Figure 2 is an enlarged sectional detail view as taken along the plane of line 2—2 of Figure 1 illustrating in particular the arrangement of the index housing sleeve with respect to the shank;

Figure 3 is a sectional detail view as taken along the plane of line 3—3 of Figure 1 illustrating the construction of one working end of the tool;

Figure 4 is an enlarged sectional detail view as taken along the plane of line 4—4 of Figure 2 illustrating in particular the arrangement of the resilient clip utilizing the invention and its coaction with respect to the index housing sleeve and the shank;

Figure 5 is a sectional detail view as taken along the plane of line 5—5 in Figure 1 illustrating the construction of the other working end of the tool;

Figure 6 is an exploded perspective view of a modified form of the invention;

Figure 7 is a sectional detail view as taken along the plane of line 7—7 of Figure 6 illustrating the working end of this form of the tool;

Figure 8 is a sectional detail view as taken along the plane of line 8—8 in Figure 7 and being of an enlarged scale for greater clarity;

Figure 9 is a perspective view of a further modified form of the invention;

Figure 10 is a sectional detail view illustrating the working end of this modified form of the invention; and Figure 11 is an elevational view of a further modified form of the invention.

With continuing reference to the accompanying drawings wherein like reference numerals designate similar parts throughout the various views, and with additional attention directed to the embodiment of the invention as is shown in Figures 1 through 5, reference numeral 10 generally designates the alignment tool comprising the present invention which may be formed of any suitable material, the invention shown in this embodiment being molded or otherwise formed of suitable synthetic plastic material such as polyethylene, polystyrene, or the like. The alignment tool includes a shank 12 having a threaded portion 14 and having working ends 16 and 18 oppositely disposed. These working ends may be in the form of two sizes of hexagonal headed heads as best seen in Figures 3 and 5 which hexagonal heads may be adapted to fit in sockets in adjusting or control devices. Obviously, any other suitable form of working end may be provided.

Rotatably disposed about the shank 12 is an index housing tubular sleeve 20. The tubular sleeve has suitable indicia 22 thereof in the form of a scale as shown together with an indicating arrow as at 24 for indicating direction. In addition to the indicia 22, as shown, there may be complementary but inverted indicia on the opposite side of the sleeve 20 so that each working end of the tool may be used with equal facility.

An origin circle 26 is suitably scribed, or otherwise formed on the shank 12 as is a spiral indicator 28. The origin circle indicator 26 as well as the spiral indicator 28 may be actually cut into the body of the shank 12 and then filled with a contrasting colored plastic or may be otherwise formed, it being noted that the shank 12 may be of any suitable color.

The sleeve 20 has a groove 32 therein and is further provided with an aperture 34 therethrough in alignment with the groove 32 and communicating therewith. Disposed in the groove is a resilient clip 36 of somewhat more than semi-circular configuration embracing the sleeve 20 and having a bight portion 38 centrally disposed with respect to the clip extending through the aperture 34 and into engagement with the threaded portion 14 of the shank 12. Hence, rotation of the sleeve 20 with respect to the shank 12 will cause an advance or retraction of the sleeve 20 depending upon the direction of rotation. This will cause the indicia 22 on the sleeve 20 to move with respect to the origin indicator 26 and the spiral indicator 28. In operation, the tool is set at an initial position with the spiral indicator 28 and the origin indicator 26 being disposed under the indicia such as the indicia represented by the numeral 10 as shown in Figure 1. Then, after properly inserting the working end in the control device to be adjusted, rotation of the shank 12 while holding the sleeve 20 against rotation will cause an advance or retraction of the sleeve with respect to the shank thus providing a clear indication of the amount of turn. The spiral indicator 28 and the indicia on the tubular sleeve 20 form a vernier scale since the spiral line intersects or passes a number of divisions during each complete turn of the tool, the number of divisions to be passed depending upon the indicia selected.

Referring now to Figure 6, it will be noted that herein there is disclosed a modified form of tool generally designated by reference numeral 60 having a shank 62 with blade ends 64 and 66. These blade ends may be in form of screwdriver blades or the like as indicated at 68 which may be removable or replaceable as desired. Further, the screwdriver blade may be embedded in the plastic material of which the shank 60 may be constructed. In addition to the vernier scale provided by the cooperation of the spiral indicator 70, the origin indicator 72 and the indicia 74, there may be provided suitable indicia 76 on the shank for indicating partial turns.

It is to be noted that in the construction of the invention, the shank 62 may be formed either solid or hollow as desired and the blades may be of any shape or size which it may be desired to utilize. In Figure 9 there is shown a further modification of the invention in which the shank 62 has an insulative or plastic cap 90 having a blade end 92 of the particular type shown for adjustment of the type of control device normally adjusted thereby. In this form of the invention the shank 62 may be provided with only one tool at the end thereof, it being noted that the use of the device as a double ended tool is purely optional.

In Figure 11 there is shown a further modification of the invention in which a screwdriver having a shank 90 with a blade 92 at the end thereof as well as a handle 94 may be adapted for use with the invention. Alternatively either the shank 90 has the threaded portion 96 integrally formed therewith or fixed thereon in the form of a cylinder fixedly secured to the shank 90. The other elements of the invention are substantially identical with the forms previously described.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed as new is as follows:

1. An alignment tool comprising a shank having a threaded portion and having a working end, said shank having an origin circle indicator extending thereabout and further having a spiral indicator extending thereabout intersecting said origin circle indicator, an index housing tubular sleeve rotatably mounted and concentrically disposed on said shank and having indicia thereon cooperating with said origin circle indicator and said spiral indicator, and a clip carried by said sleeve and having an intermediate part engaging said threaded portion for causing and controlling relative longitudinal movement of said sleeve upon rotation of said sleeve with respect to said shank.

2. An alignment tool comprising a shank having a threaded portion and at least one working end, said shank provided with an origin marking, an insulating sleeve rotatably mounted on said shank and having a marking which coacts with said origin marking to indicate relative positions of said sleeve and shank, means for controlling the relative longitudinal movement of said sleeve and shank in response to relative rotation between said sleeve and shank, said means including a clip having a pair of sides and an intermediate part fixed to both of said sides, said sleeve having an essentially circumferential groove opening through the outer surface thereof, said sleeve also having an aperture which opens through the inner surface thereof and which is registered with said groove, said clip sides disposed in portions of said groove, said clip intermediate part extending through said aperture and engaging the threaded portion of said shank.

3. An alignment tool comprising a shank having a threaded portion and at least one working end, said shank provided with an origin marking, a sleeve rotatably mounted on said shank and having a marking which coacts with said origin marking to indicate relative positions of said sleeve and shank, means for controlling the relative longitudinal movement of said sleeve and shank in response to relative rotation between said sleeve and shank, said means including a clip having a pair of sides and an intermediate part fixed to both of said sides, said sleeve having an essentially circumferential groove opening through the outer surface thereof, said sleeve also having an aperture which opens through the inner surface thereof and which is registered with said groove, said clip sides disposed in portions of said groove, said clip intermediate part extending through said aperture and engaging the threaded portion of said shank.

References Cited in the file of this patent

UNITED STATES PATENTS

| 2,736,220 | Kumuk | Feb. 28, 1956 |
| 2,790,343 | White | Apr. 30, 1957 |
| 2,817,985 | Capelle | Dec. 31, 1957 |

FOREIGN PATENTS

| 448,530 | Great Britain | June 10, 1936 |